Feb. 15, 1955 — C. E. TACK ET AL — 2,702,097
COMBINATION WHEEL AND DISK RAILWAY BRAKE
Filed Jan. 11, 1951 — 3 Sheets-Sheet 1

INVENTORS.
Carl E. Tack and
Donald E. Cummings

Feb. 15, 1955 C. E. TACK ET AL 2,702,097
COMBINATION WHEEL AND DISK RAILWAY BRAKE
Filed Jan. 11, 1951 3 Sheets-Sheet 2
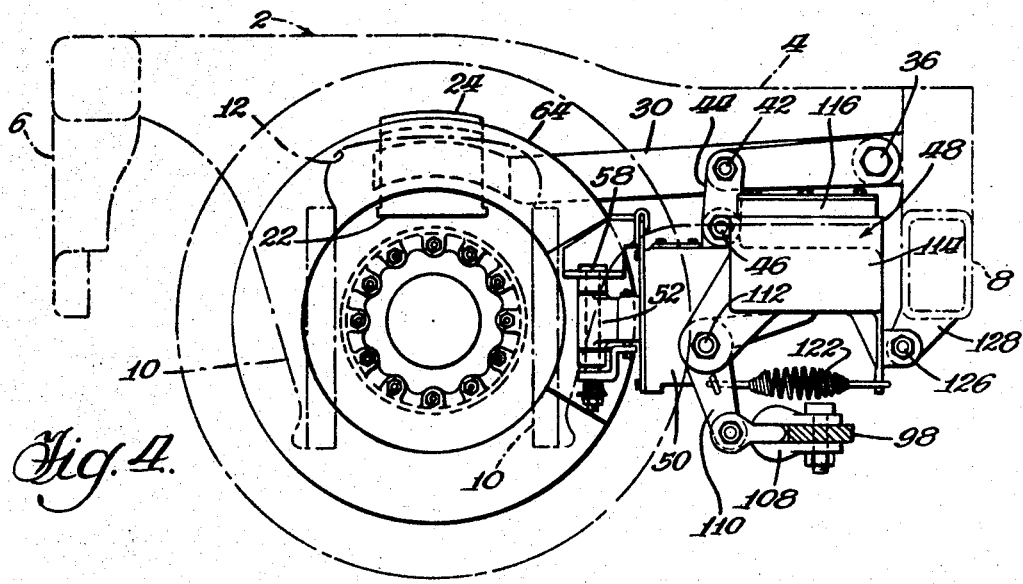
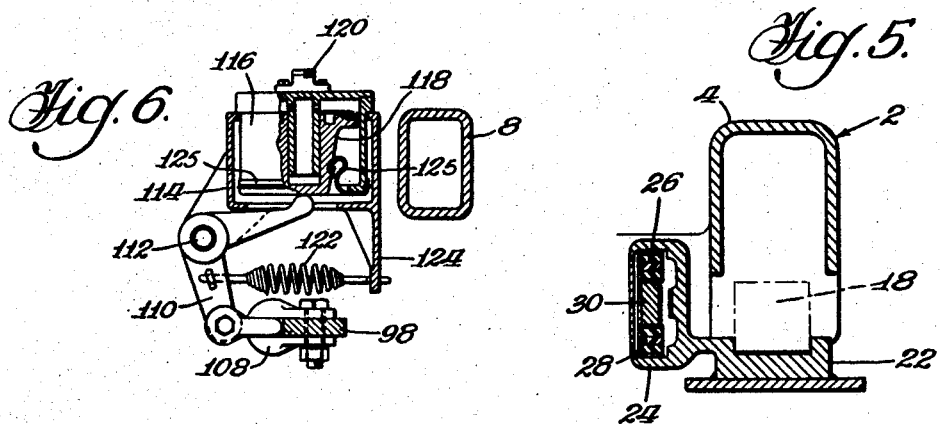
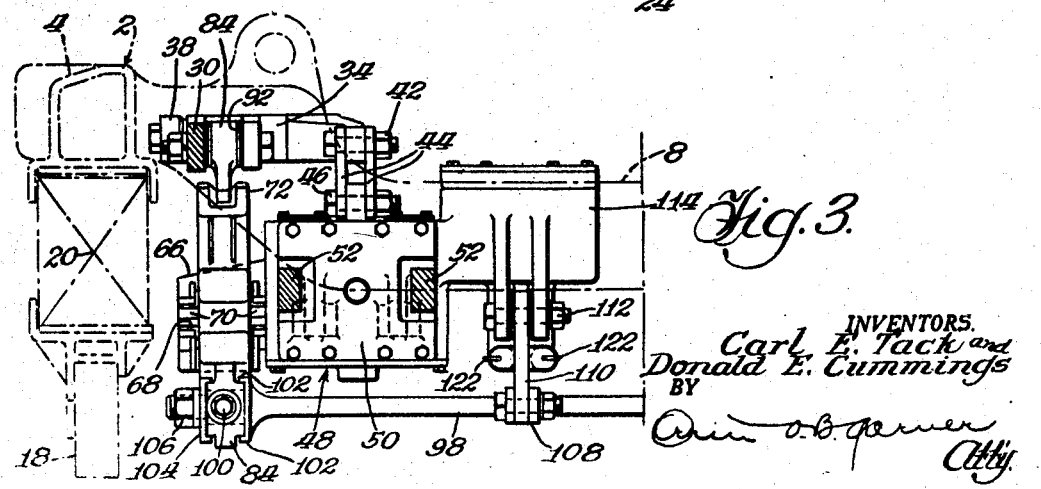
INVENTORS.
Carl E. Tack and
Donald E. Cummings
BY Feb. 15, 1955  C. E. TACK ET AL  2,702,097
COMBINATION WHEEL AND DISK RAILWAY BRAKE
Filed Jan. 11, 1951  3 Sheets-Sheet 3
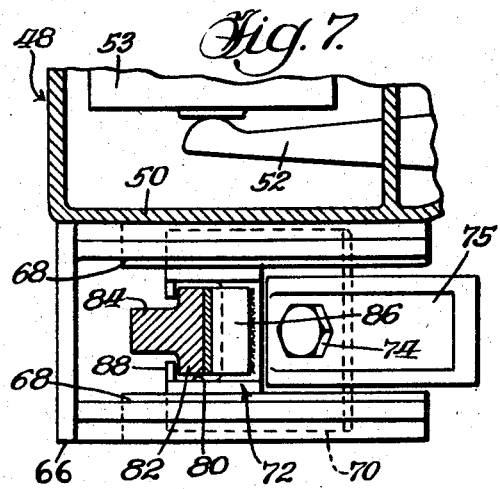
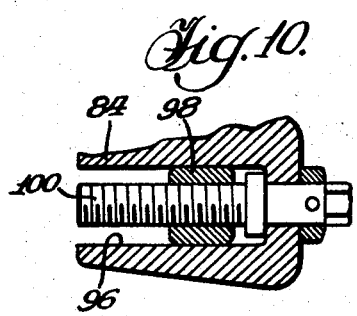
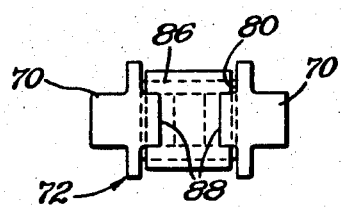
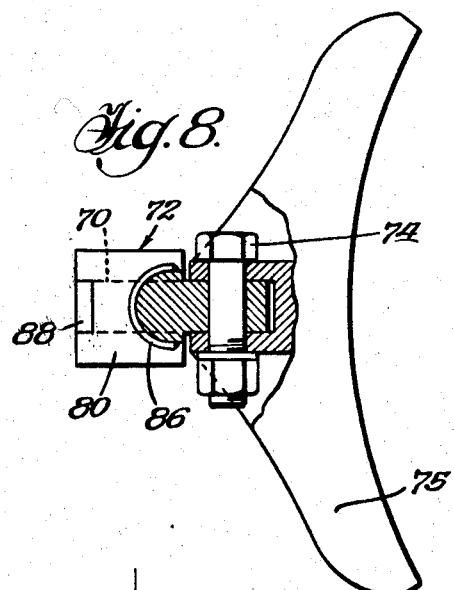
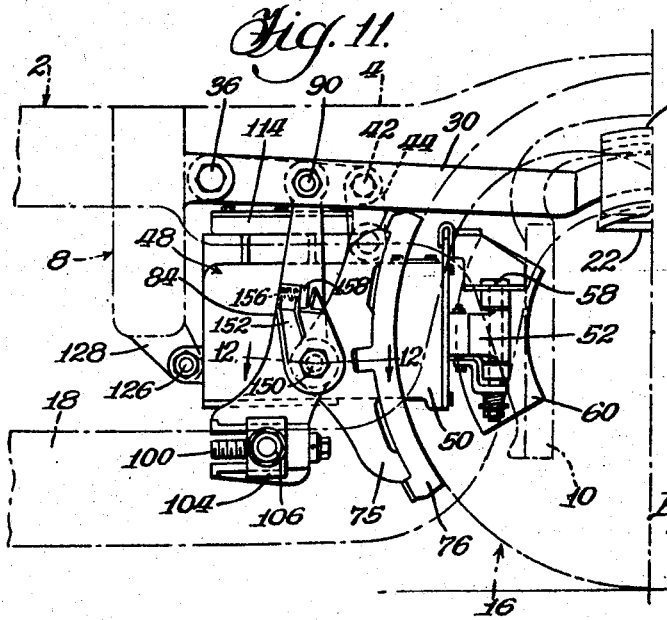
INVENTORS.
Carl E. Tack and
Donald E. Cummings

United States Patent Office 2,702,097
Patented Feb. 15, 1955

2,702,097

COMBINATION WHEEL AND DISK RAILWAY BRAKE

Carl E. Tack, Chicago, and Donald E. Cummings, Wood River, Ill., assignors to American Steel Foundries, Chicago, Ill., a corporation of New Jersey Application January 11, 1951, Serial No. 205,546

16 Claims. (Cl. 188—59)

This invention relates to railway brakes and more particularly to the suspension of a brake support and to novel means for transmitting torque from said support to an unsprung part of a railway vehicle.

A primary object of the invention is to devise a novel brake support for carrying wheel and off wheel brake means adapted to decelerate rotation of a wheel and axle assembly of a railway vehicle.

Another object of the invention is to devise a novel system for transmitting torque from the brake support to the railway vehicle.

A further object of the invention is to devise a package or unit comprising wheel and off wheel brake means and adapted for quick assembly and disassembly, with respect to the railway vehicle.

Still another object of the invention is to devise an arrangement wherein arcuate brake shoes are maintained in substantial concentricity with respect to the brake surfaces of the wheel and axle assembly.

The foregoing and other objects and advantages of the invention will become apparent from a consideration of the following specification and the accompanying drawings, wherein:

Figure 3 is a sectional view taken substantially on the line 3—3 of Figure 1;

Figure 4 is a sectional view taken substantially on the line 4—4 of Figure 1;

Figure 5 is a sectional view taken substantially on the line 5—5 of Figure 1;

Figure 6 is a sectional view on the line 6—6 of Figure 1 with portions of the structure shown in elevation for the sake of clarity;

Figure 7 is a fragmentary top plan view with portions of the structure broken away;

Figure 8 is a side elevational view of the wheel brake head and guide bar with portions of the structure broken away;

Figure 9 is a rear elevational view of the guide bar shown in Figure 8;

Figure 10 is a fragmentary vertical sectional view through the wheel brake lever and its slack adjuster connection to its actuating brake beam;

Figure 11 is a fragmentary side elevational view comparable to Figure 2 but illustrating a modified connection between the wheel brake head and its actuating lever; and Figure 12 is a sectional view on the line 12—12 of Figure 11.

Figures 1, 2:
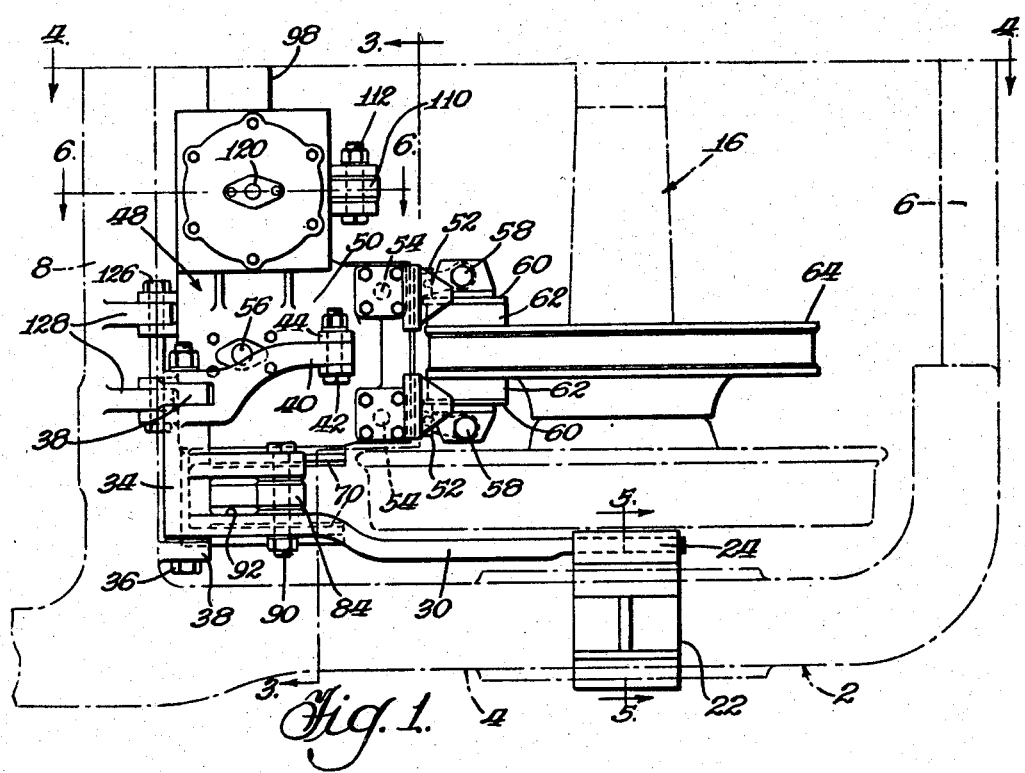
Figure 1 is a fragmentary top plan view of a railway car truck embodying the invention, only one-quarter of the truck being illustrated in phantom lines, inasmuch as the truck structure is conventional and the brake system is symmetrical about the longitudinal and transverse vertical center planes of the truck.
Figure 2 is a side elevational view of the structure shown in Figure 1.

In each of said views, certain details may be omitted where more clearly seen in other figures.

Describing the invention in detail and referring first to the embodiment thereof illustrated in Figures 1 to 10, the novel brake is illustrated as applied to a standard passenger car truck, best seen in Figures 1 to 3 and comprising a sprung frame, generally designated 2, having a side rail 4 at each side thereof, an end rail 6 at each end thereof and a transom 8 connecting the side rails adjacent each end rail, the transoms being adapted to carry conventional bolster support means (not shown).

Each side rail 4, is provided adjacent each end thereof with a pair of depending pedestal legs 10 (Figure 2) defining a jaw 12 within which is received a journal box 14 of a conventional wheel and axle assembly 16, the journal boxes 14 at each side of the truck affording support in the usual manner for an unsprung equalizer 18 carrying conventional springs 20 (Figure 3) for supporting the sprung frame 2. As best seen in Figures 2 and 5, each end of each equalizer 18 rests on a seat 22, carried by the related journal box 14 and having an inboard jaw 24 carrying top and bottom resilient pads 26 and 28, which clamp therebetween a torque arm 30.

The torque arm 30 comprises a hub 34 pivotally connected as at 36 to lugs or brackets 38 on the adjacent transom 8, and the hub 34 is connected to another torque arm 40 disposed inboardly of the adjacent wheel and defining with the outboard torque arm 30 a jaw-like structure receiving the wheel therewithin. The inboard torque arm 40 is pivotally connected at 42, as best seen in Figure 3 to links 44, which are pivotally connected at 46 to a brake frame or support generally designated 48.

The brake support 48 comprises an outboard cylinder housing 50, having rotor brake levers 52 pivotally connected thereto as at 54 (Figure 1), and adapted for actuation by a conventional power cylinder device 53 (Figure 7) within the housing 50, which is provided with a nozzle 56 (Figure 1) for admitting actuating fluid such as compressed air to the device 53 for actuating the levers 52. The levers 52 are pivotally connected as at 58 to brake heads 60 carrying brake shoes 62 (Figure 1) for braking engagement with opposite sides of a conventional brake disk or rotor 64 to decelerate rotation of the wheels of the assembly 16.

Connected to the outboard side of the housing 50 of the brake support 48 is a bracket 66 which, as shown in Figures 2, 3 and 7, comprises inboard and outboard jaws or grooves 68 within which lugs 70 of a brake head support 72 are slidably fitted for reciprocal movement along ledges defined by the bottom of said grooves, toward and away from the related wheel of the assembly 16 along a diagonal plane approximately intersecting the rotational axis of said assembly, as best seen in Figure 2.

The brake head support 72, as best seen in Figures 7 and 8, is pivotally connected as by a bolt and nut assembly 74 to a brake head 75 carrying a conventional brake shoe 76 (Figure 2) for engagement with the peripheral or tread surface of the adjacent wheel. The brake head support 72 also comprises a brake lever slot 80, as best seen in Figures 7 and 9, and the slot 80 is adapted to receive an arcuate bearing portion 82 of the truck lever 84, said portion being engageable with an arcuate bearing portion 86 (Figures 7 and 9) of the brake head support 72 for actuation of the brake head 75. The brake head support 72 also comprises a pair of lugs 88 at the rear extremity of the slot 80 to engage the lever bearing portion 82 upon release of the lever 84, whereby as hereinafter described in connection with the operation of the device, the brake head 75 is retracted to disengage its brake shoe 76 from the related wheel.

The upper end of the truck lever 84 is pivotally connected as at 90 within a jaw 92 (Figures 1 and 3) of the torque arm 30, and the lower end of the lever 84 is provided with a jaw or slot 96 within which is received a brake beam 98 connected to the lever 84 by a threaded bolt or screw 100 functioning as a slack adjuster screw to adjust the position brake shoe 76 with respect to the related wheel, as will be understood by those skilled in the art.

As best seen in Figure 3, the brake beam 98 comprises top and bottom lugs 102 engaged with complementary shoulders on the inboard side of the brake lever 84, and the outboard end of the beam 98 is secured by a retainer plate 104 having similar guideable engagement with complementary shoulders at the outboard side of the lever 84. The retainer plate 104 is secured by a nut 106 threaded on the outboard end of the beam 98.

The beam 98, as best seen in Figures 3 and 6, is pivotally connected as by a link and clevis 108 to the lower end of a bell crank lever 110, which is pivotally fulcrumed at 112 to a cylinder housing 114 connected to, or integrally formed with the housing 50 at the inboard side thereof. The housing 114 contains a cylinder 116 (Figure 6) having a piston 118 slidably fitted therein. A nozzle 120 is secured to the top of the cylinder 116 for admitting actuating fluid, such as compressed air to the cylinder for operation of the piston 118, which actuates the bell crank lever 110 and brake beam 98. Release springs 122 are connected between the lower arms of the lever 110 and a depending bracket 124 of the housing 114. An annular dust guard 125, of any suitable flexible material, is secured to the lower end of the cylinder 116 and to the piston 118 to prevent dust from entering therebetween.

As shown in Figure 3, one end of the beam 98 is connected, as above described, to a brake lever 84, and the opposite end of the beam (not shown) is connected to the brake lever 84 (not shown) at the opposite side of the truck.

The brake support 48 is pivotally connected by the pin at 126 (Figures 1 and 2) to lugs 128 depending from the adjacent transom 8, whereby as the sprung truck frame 2 oscillates vertically, with respect to the unsprung equalizer 8 and assembly 16, the brake support 48 pivots about a rotational axis at the pin 126 to maintain the arcuate brake shoes 62 and 76 in substantial concentricity, with respect to the wheel tread surface and the brake surfaces of the rotor 64, or it may be said that the shoes 62 and 76 are maintained in substantial radial alignment or relation with the longitudinal axis of the wheel and axle assembly, thereby insuring a smooth and uniform brake application and affording maximum braking area at all times.

A modification of the invention is illustrated in Figures 11 and 12, wherein parts corresponding to those of the first described embodiment are identified by corresponding numerals.

In the modification of Figures 11 and 12, the wheel tread brake head 75 is supported directly by the lever 84 which is pivotally connected as at 150 to the brake head 75 and to a friction arm 152 urged against the outboard side of the brake head 75 by a compression spring 154 (Figure 12).

As best shown in Figure 11, the upper end of the friction arm 152 houses a compression spring 156 engageable with a lug or abutment 158 formed or mounted on the outboard side of the lever 84. Thus it will be understood, that as the lever 84 is released, it rotates in a clockwise direction about its pivot point 90, and any tendency for the upper end of the brake shoe 76 to drag against the related wheel tread surface of the wheel and axle assembly 16, is overcome by the compression spring 156, which rotates the arm 152 and brake head 75 in unison in a counterclockwise direction about the pivot point 150. As wear takes place between the wheel tread and the engaging surface of the brake shoe 76, the lug 158 is effective during brake applications from time to time by engagement with the friction arm 152 to rotate the arm in a counterclockwise direction relative to the brake head 75 about the pivot point 150 to compensate for such wear.

It may be noted that the modification of Figures 11 and 12 differs from the first described embodiment in supporting the brake head 75 directly from the lever 84, as above described. The other parts of the brake arrangement shown in Figures 11 and 12 are identical in construction and operation to those previously described in connection with Figures 1 to 10.

We claim:

1. In a brake arrangement for a railway car truck wherein a wheel and axle assembly supports sprung and unsprung parts, and brake means are operative to engage a wheel tread surface and an off-wheel surface of said assembly, respectively; the combination of a brake support pivotally supported to the sprung parts, a pair of brake levers pivoted to the support and carrying certain of said brake means, said support having inboard and outboard ledges slidably supporting the other of said brake means, a brake lever operatively connected to said last-mentioned brake means, a torque arm operatively carried by said sprung part and said assembly, a pivotal connection between the arm and the last-mentioned lever, a link pivotally connected to the arm and the support, and separate means actuating each of said brake means, the support, the brake lever, the arm, and the link formed and arranged to maintain each of the brake means in substantial concentricity with the related surface.

2. In a brake arrangement for a railway car truck wherein a wheel and axle assembly supports sprung and unsprung parts, and brake means are operative to engage a wheel tread surface and an off-wheel surface of said assembly, respectively; the combination of a brake support pivotally connected to the sprung part on a pivotal axis approximately parallel to the longitudinal axis of said assembly, said support having spaced inboard and outboard ledges, a support member for one of said brake means slidably supported by said ledges, a truck lever having a bearing portion received within a complementary slot in said member and engageable therewith for actuation of said one brake means, said member having means engageable with the truck lever upon release thereof for moving the brake means to released position, a pair of brake levers fulcrumed to the support on parallel axes approximately perpendicular to the first-mentioned axis and operative to carry the other brake means, a torque transmitting unit supported at spaced points by the assembly and the sprung part, a link pivotally connected to said unit on an axis passing between said points, said link being pivotally connected to the support on an axis approximately parallel to the last-mentioned axis, a pivotal connection between the brake lever and the unit on an axis passing between said points and approximately parallel to the last-mentioned axis, and power means for actuating each of said brake means, the unit, the link, the support and the truck lever formed and arranged to maintain substantial concentricity between the brake means and the related surfaces.

3. In a brake arrangement for a vehicle having a truck and a supporting wheel and axle assembly; the combination of a torque transmitting structure supported at spaced points by the truck and assembly, respectively, a brake support pivoted to the truck on an axis approximately parallel to the rotational axis of said assembly, a brake lever pivoted to said structure on an axis passing between said points and approximately parallel to the first mentioned axis, a link pivoted to said structure on an axis passing between said points and approximately parallel to the first mentioned axis, said link being pivotally connected to the support on an axis approximately parallel to the first mentioned axis, a brake head operatively connected to said lever for actuation thereby, brake shoe means carried by said head for braking engagement with the wheel of said assembly, a brake beam connected to the lower end of the lever, an operating lever fulcrumed to the support and operatively connected to the beam, and a power device carried by the support and operatively connected to the operating lever for actuation thereof.

4. In a brake arrangement for a vehicle having a wheel and axle assembly with a peripheral tread surface on the wheel, an unsprung truck part supported thereby, and another truck part spring-supported by said unsprung part; the combination of a torque transmitting member supported at spaced points by said parts respectively, a brake support pivotally supported by said other part on a pivotal axis approximately parallel to the rotational axis of said assembly, a truck lever pivotally fulcrumed to said member on an axis disposed between said points and approximately parallel to the first mentioned axis, a link pivotally connected to said member on a pivotal axis disposed between said points and approximately parallel to the first mentioned axis, said link being pivotally connected to the support on a pivotal axis beneath said member and approximately parallel to the first mentioned axis, power means carried by the support and operatively connected to the lower end of said lever for actuation thereof, a brake head operatively connected to said lever for actuation thereby as the lever is actuated by said power means, and brake shoe means carried by the brake head for braking engagement with the tread surface of said assembly.

5. In a brake arrangement for a vehicle having a wheel and axle assembly with a tread surface thereon and having a truck frame structure including an unsprung part supported by said assembly and a sprung part; the combination of a torque transmitting member having an arm connected between said parts and having another arm disposed inboardly of the first mentioned arm, a brake support pivotally connected to the sprung part, a link pivotally connected to the support and to said other arm, a lever pivotally connected to the first mentioned arm, a brake head operatively connected to the lever for actuation thereby, brake shoe means carried by the head for braking engagement with the tread surface of said assembly, and means carried by the support and operatively connected to the lever for actuation thereof.

6. In a brake arrangement for a railway car truck having a wheel and axle assembly and a truck frame structure including sprung and unsprung parts supported by said assembly; the combination of a torque transmitting structure supported by said parts, a brake support pivotally connected to the sprung part, a link pivotally connected to the support and to the torque transmitting structure, a truck lever pivotally connected to the torque transmitting structure, means carried by the support and operatively connected to the lever for actuation thereof, and brake means connected to the lever operative to engage said wheel and thereby to decelerate rotation of said assembly.

7. In a brake arrangement for a railway car truck having a wheel and axle assembly and a truck frame structure including sprung and unsprung parts supported by said assembly; the combination of a member having a hub pivoted to the sprung part and having an arm extending from the hub and supported by the unsprung part, said member having another arm extending from the hub toward said assembly in spaced relationship to the first mentioned arm, said arms receiving therebetween a wheel of said assembly, a brake support pivotally mounted on the sprung part, connection means between the support and the second mentioned arm for transmitting braking torque to the second-mentioned arm, a truck lever pivotally fulcrumed to the first mentioned arm, brake means operatively connected to the lever for braking engagement with said wheel, and means carried by the support for actuating said lever.

8. In a brake arrangement for a railway car truck having a wheel and axle assembly and having a truck frame structure supported by said assembly and including sprung and unsprung parts; the combination of a substantially rigid torque transmitting structure pivotally connected to both parts, a brake support pivotally connected to the sprung part, a link pivotally connected to the support and to the torque transmitting structure, brake means engageable with said wheel for decelerating said assembly, a truck lever having a connection to said structure and spaced therefrom operatively connected to said brake means for actuation thereof, and means carried by the support and operatively connected to the truck lever for actuating the same.

9. In a brake arrangement for a railway car truck having a wheel and axle assembly and having a truck frame structure supported thereby and including sprung and unsprung parts; the combination of a torque transmitting member having a resilient universal connection to one of the parts and having a pivotal connection to the other part, an arm connected to said member and extending inboardly thereof, a brake support carried by said arm and said sprung part, a truck lever fulcrumed to said member, brake means operatively connected to the lever for braking engagement with said assembly, and power means carried by the support for actuating said lever.

10. In a brake arrangement for a railway car truck wherein a truck frame is spring supported from a wheel and axle assembly and arcuate brake means engage the tread surface of the wheel and an off-wheel surface of the assembly; the structural combination of a support for said brake means carried by the truck frame, a torque arm pivotally connected to the frame and supported by the assembly, and a link pivotally connecting said support to said arm, whereby said structural combination is operative to maintain substantial concentricity between the arcuate brake means and the related surfaces.

11. In a brake arrangement for a railway car truck having a wheel and axle assembly and having a truck frame structure with sprung and unsprung parts supported by said assembly; the combination of a brake support supported by said sprung part, said support having spaced ledges extending toward a wheel of said assembly, a shoe carrying a brake head slidably supported by the ledges, a torque arm extending between and supported by said parts, means connecting the support to said arm for transmitting braking torque thereto, and means fulcrumed to the torque arm and operatively connected to the brake head for actuation thereof.

12. In a brake arrangement for a railway car truck having a wheel and axle assembly and having a truck frame structure with sprung and unsprung parts supported by said assembly; the combination of a brake support pivotally connected to the sprung part, a torque member extending between and connected to said parts, means connecting the support to said member for transmitting braking torque thereto, spaced support ledges on said support extending toward a wheel of said assembly, a brake head support member having lugs slidably supported by said ledges and having a bearing portion between said lugs, a truck lever having a bearing portion engageable with the first mentioned bearing portion, means carried by the support for actuating said truck lever, a brake head carried by said support member, and brake shoe means carried by said head for braking engagement with said wheel upon actuation of said truck lever.

13. In a brake arrangement for a railway car truck having a wheel and axle assembly and having a truck frame structure supported thereby and including sprung and unsprung parts; the combination of a torque member extending between and carried by said parts, a brake support carried by the sprung part, connection means between the support and said member for transmitting braking torque to the member, a truck lever pivoted to said member and extending downwardly therefrom, a brake head, spaced support ledges on said support at opposite sides of said head, a brake head support member carried by said ledges and connected to the head, said lever having a bearing portion between said ledges and engageable with said member, a brake beam extending beneath said ledges and connected to said lever, and power means operatively connected to said beam for actuation thereof.

14. In a brake arrangement for a railway car truck having a wheel and axle assembly with off-wheel friction surfaces and having a truck frame structure supported thereby and including sprung and unsprung parts; the combination of a torque member extending between and directly supported by said parts, a brake support pivotally carried by the sprung part, said member being entirely disposed above said support, a link pivotally connected to the torque member and extending downwardly therefrom, said link being pivotally connected to the support beneath said torque member, a pair of brake levers pivotally mounted on said support, friction means operatively connected to said levers and adapted for braking engagement with the surfaces of said assembly, and means for operating the levers.

15. In a brake arrangement for a railway car truck having a wheel and axle assembly with off-wheel braking surfaces thereon and having a truck frame structure supported by said assembly and including sprung and unsprung parts; the structural combination of a torque member extending between and supported by said parts, a brake support pivotally connected to the sprung member, means connecting the support to the torque member for transmitting braking torque thereof, brake levers pivoted to the support, arcuate friction means operatively connected to the levers for braking engagement with the surfaces of said assembly, power means carried by the support for operating said brake levers, a brake head, arcuate brake shoe means carried by said head for braking engagement with a wheel of said assembly, a truck lever operatively connected to said brake head for actuation thereof, a power device carried by said support inboardly of said power means, and an operative connection between said device and said lever extending beneath said power means, whereby the structural combination recited maintains the arcuate friction means and brake shoe means in substantial radial relation with the longitudinal axis of the wheel and axle assembly.

16. In a brake arrangement for a railway car truck having a wheel and axle assembly and an annular brake surface encircling the axle and having sprung and unsprung truck parts supported thereby; the combination of a torque arm extending between and directly supported by said respective parts, a brake support pivotally carried by the sprung part, said torque arm being entirely disposed above said support, a link pivotally connected to the torque arm and brake support, and brake means carried by the support for engagement with the annular brake surface, whereby during relative movement between said sprung and unsprung parts, said brake means remain substantially concentric to said surfaces.

(References on following page)

References Cited in the file of this patent

UNITED STATES PATENTS

| | | |
|---|---|---|
| 345,093 | Westinghouse | July 6, 1886 |
| 1,686,648 | Baselt | Oct. 9, 1928 |
| 2,357,619 | Tack | Sept. 5, 1944 |
| 2,360,967 | Mueller | Oct. 24, 1944 |
| 2,418,057 | Tack et al. | Mar. 25, 1947 |
| 2,438,482 | Tack | Mar. 23, 1948 |
| 2,497,417 | Sale | Feb. 14, 1950 |
| 2,550,732 | Tack et al. | May 1, 1951 |